A. WEILAND.
FUEL FEEDING DEVICE FOR INTERNAL COMBUSTION ENGINES.
APPLICATION FILED MAR. 29, 1916.
1,237,591.
Patented Aug. 21, 1917.
2 SHEETS—SHEET 1.
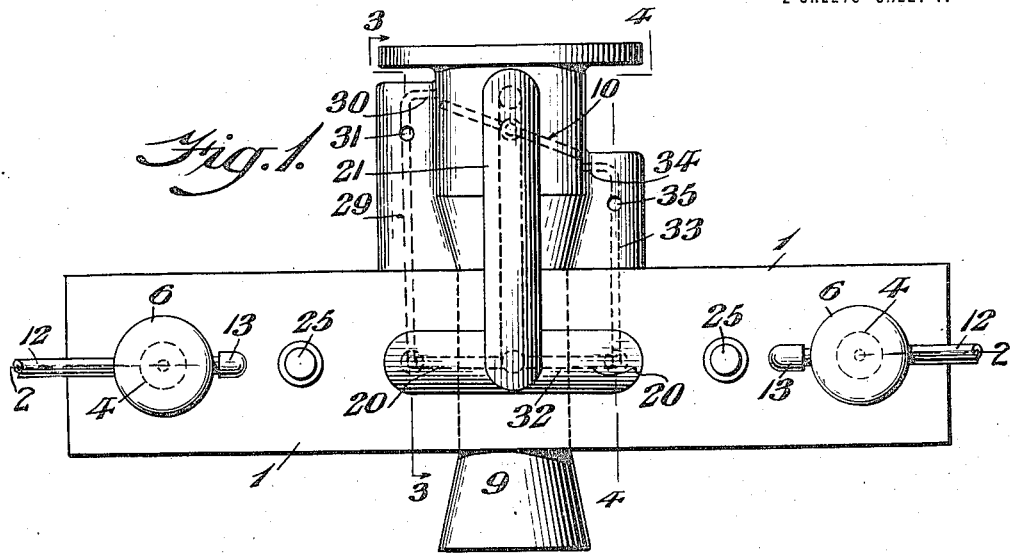
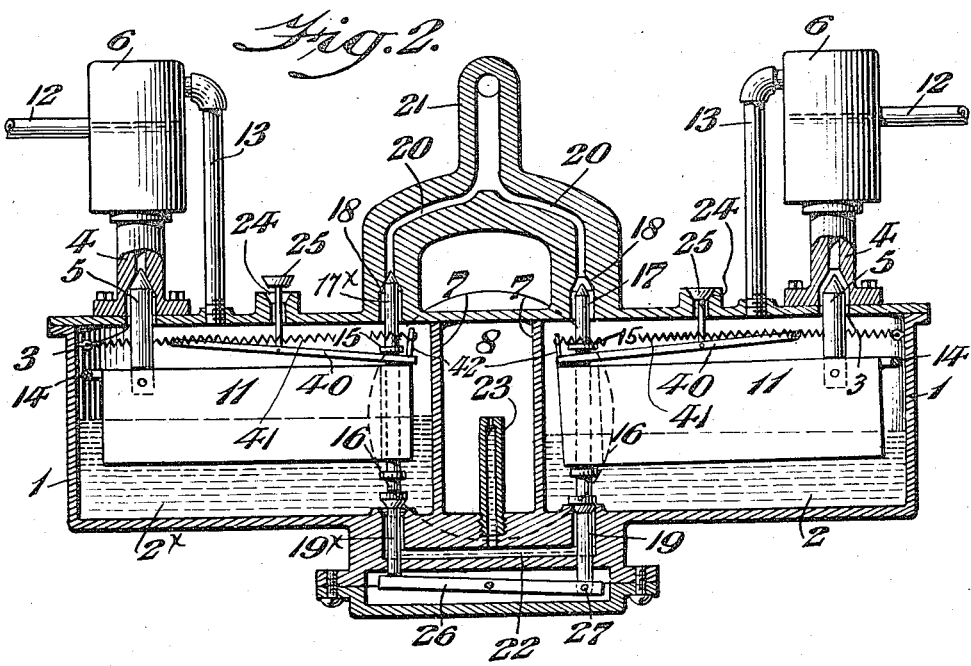
WITNESSES:
William J. Jackson
INVENTOR
Alfred Weiland
BY
Robert M. Barr
ATTORNEY A. WEILAND.
FUEL FEEDING DEVICE FOR INTERNAL COMBUSTION ENGINES.
APPLICATION FILED MAR. 29, 1916.
1,237,591.
Patented Aug. 21, 1917.
2 SHEETS—SHEET 2.
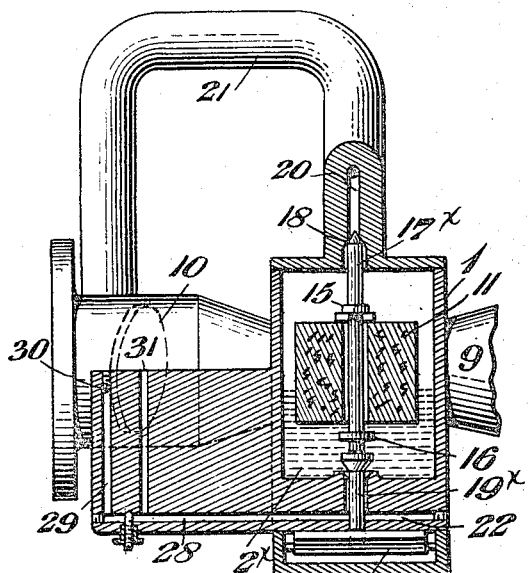
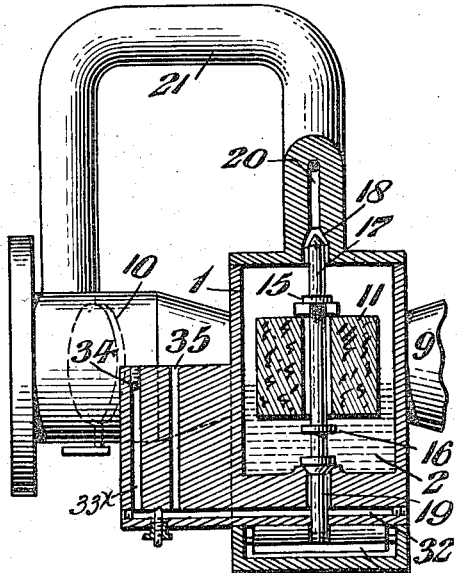
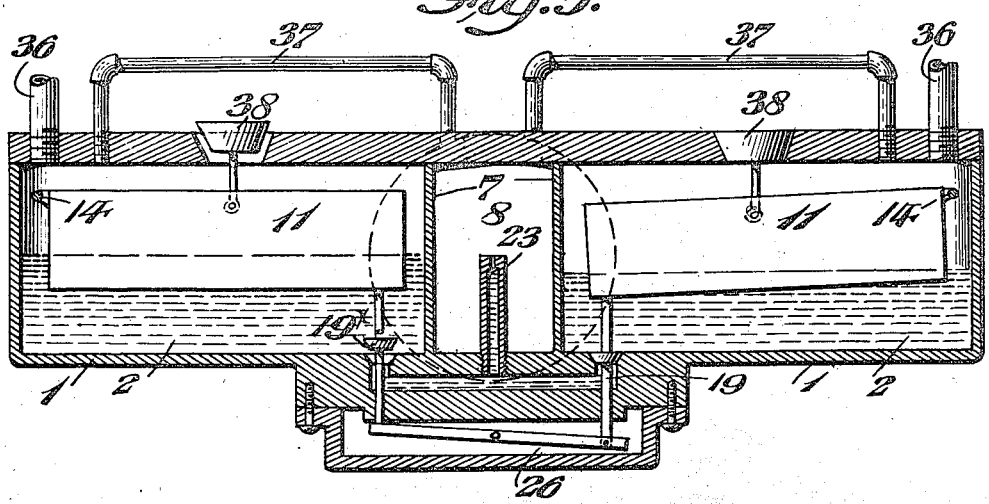
WITNESSES:
INVENTOR
Alfred Weiland
BY
Robert M. Barr
ATTORNEY

UNITED STATES PATENT OFFICE.

ALFRED WEILAND, OF EAST ORANGE, NEW JERSEY.

FUEL-FEEDING DEVICE FOR INTERNAL-COMBUSTION ENGINES.

1,237,591.　　　　　Specification of Letters Patent.　　Patented Aug. 21, 1917.

Application filed March 29, 1916. Serial No. 87,392.

*To all whom it may concern:*

Be it known that I, ALFRED WEILAND, a citizen of the United States, residing at East Orange, county of Essex, and State of New Jersey, have invented a certain new and useful Fuel-Feeding Device for Internal-Combustion Engines, of which the following is a specification.

The present invention relates to explosive engines generally and more particularly to the control, regulation and feeding of liquid fuel to the engines of motor vehicles, motorboats and the like.

It is an object of my invention to provide a carbureter which operates automatically to maintain an available supply of liquid fuel subject to the demands of the engine and to maintain such supply irrespective of the position of the fuel supply tank or source so that liquid fuel will be fed to the carbureter in regulated quantities, whether the supply tank is above or below the horizontal plane of the engine intake pipe. A further object of the invention is to provide a relatively sensitive valve mechanism automatically controlled by conditions within the carbureter whereby the main carbureter chamber is alternately subjected to atmospheric pressure and to vacuum conditions.

Another object of my invention is to provide a carbureter having a plurality of separate liquid fuel containing chambers both having connection with the main jet for supplying the engine intake, said chambers being adapted to supplement one another and operating in conjunction with an automatic liquid fuel control responsive to engine demands and the liquid level, whereby under substantially every working condition, there is an active as well as a reserve supply of fuel available, said active and reserve supplies acting either together or alternately according to conditions. A still further object is to provide a carbureter having active and reserve bodies of liquid fuel and means to automatically control the replenishing of either body, said means operating simultaneously or alternately according to existing conditions and requirements.

For the purpose of illustrating my invention, I have shown in the accompanying drawings, one form thereof which is at present preferred by me, although it is to be understood that the various instrumentalities of which my invention consists can be variously arranged and organized and that my invention is not limited to the precise arrangement and organization of the instrumentalities as herein shown and described.

Referring to the drawings:

Figure 1 represents a plan of a carbureter and fuel feeding device embodying my invention.

Fig. 2 represents a section on line 2—2 of Fig. 1.

Fig. 3 represents a section on line 3—3 of Fig. 1.

Fig. 4 represents a section on line 4—4 of Fig. 1 shown in reversed position.

Fig. 5 represents a sectional elevation of a modified form of fuel feeding device.

1 designates generally the casing forming the body of the carbureter and providing a suitable chamber or reservoir for the liquid fuel and from which the fuel is drawn in a vaporized condition mixed with air in proper proportions and delivered to the engine. The casing 1 in the present instance is provided with two fuel inlets 3 which have communication with a pipe 4 controlled by the valve-piece 5. These inlets 3 are preferably located at opposite sides of the casing 1, while the pipes 4 serve to deliver the liquid fuel from the auxiliary reservoirs 6 which are respectively mounted in alined relation with the said inlets 3. While I have referred to the chamber as substantially a single chamber, it will be noted that in the preferred form, the casing 1 is subdivided by the partitions 7 into three chambers, the outer two being designated respectively by the reference numerals 2 and $2^x$, while the intermediate chamber 8 has communication with and forms a part of the transverse air conduit 9 which conducts the mixed air and fuel past the throttle valve 10 to the engine intake pipe. Since in the present embodiment of my invention, the parts contained within the two chambers as well as the other adjuncts thereof are duplicates, I shall for convenience describe but one side of the device but applying the same reference characters to all like parts. The valve 5 which controls the inlet of liquid fuel to the chamber 2 is secured in the present instance to a float 11 in order to move therewith and thus open and close the inlet in accordance with the demand for liquid fuel as determined by the level of the liquid within the chamber 2. The auxiliary reservoir or receptacle 6 from which the chamber 2 is supplied with liquid fuel is provided with a supply pipe 12 which connects with the main source of the liquid fuel supply, while the upper end of the receptacle 6 has communication by way of a conduit 13 with the chamber 2 above the normal liquid level. From the above, it will be seen that pressure conditions in the upper part of the receptacle 6 are exactly the same as in the upper part of the chamber 2 and consequently when the valve 5 is opened, liquid therein will flow by gravity to the chamber 2. The float 11 in the present instance is mounted upon a pivot 14 for swinging movement and its free end preferably terminates between a pair of collars 15 and 16 which are fixed to the stem 17 of a double ended valve structure, the valve members of which are designated respectively by the reference numerals 18 and 19. The former of these controls a passage 20 leading from the chamber 2 to a bypass pipe 21 which connects to and communicates with the aforesaid mixture conduit 9. As here shown, this bypass 21 terminates in close proximity to the throttle 10 but on the side toward the engine so that under all conditions of operation, it is subjected to the engine suction. The valve 19 is arranged to control a passage 22 leading to the main jet or nozzle 23 which delivers the fuel to the passageway 8. 24 designates an auxiliary air vent in the upper part of the chamber 2 and controlled by the valve 25, which as here shown, has its stem positively connected to a pivoted lever 40. The free end of this lever normally rests upon the top of the float and moves therewith so that as the float rises, the air vent 24 will open, while under reversed conditions it will be closed. In connection with the fixed collars 15 and 16, it will be noted that there is sufficient clearance between each and the float so that normally small variations in the liquid level do not cause movement of the valve stem 17 but should these movements exceed the normal, then the float picks up one or the other of the collars and causes one of the valves to open while the other closes.

With reference to the duplication of parts in the two chambers, it will be seen that I have preferred to employ the jet 23 as a common fuel discharge for the two chambers and the passage 22 therefore has communication with both of the aforesaid chambers. In connection with this construction, it will be noted that one of the valve stems 17 here shown as the one at the right in Fig. 2 is integral with or connected directly to the valve 19 while the opposite valve stem 17ˣ is a separate element disconnected from the discharge valve 19ˣ. The stems of both the valves 19 and 19ˣ are suitably extended and lie in the path of movement of a pivoted lever 26, one end of which is fixed or pivotally connected at 27 to the stem of the valve 19, its opposite end being arranged to contact with the valve 19ˣ to be movable independently thereof. 28 designates a lateral continuation of the passage 22 and having communication with a conduit 29 which leads to and connects with the mixture passage 8. As here shown, the outlet 30 of this conduit is beyond the throttle valve; in other words, nearer the engine intake. 31 designates an air vent passage having communication with the lateral passage 28. 32 designates a lateral continuation of the passage 22 similar to that shown at 28 but at the opposite side and connecting with a conduit 33 which terminates in an opening or outlet 34 into the same mixture passage 8. This passage 32 is likewise provided with an air vent conduit 35 so that under certain suction conditions, air and fuel are drawn through the auxiliary conduit 33. The outlet 34 in this instance is on the opposite side of the throttle from the outlet 30 that is to say upon the side nearest the fuel supply device. Both the conduits 29 and 33 are normally filled with liquid fuel to the normal level in the casing 1 and serve to supply a rich mixture to the engine under certain conditions and one may operate independently of the other and in some instances both come into action at the same time.

In Fig. 5, I have shown a modification of the fuel feeding device of my invention wherein certain of the valve movements and parts have been omitted though in a general way, the operation is substantially the same. Thus the floats 11 in the chambers 2 and 2ˣ as well as the valve members 19 which control lever 26 are similar to those already described for the preferred form and I have therefore applied the same reference numerals thereto. In this modification, each of the chambers 2 and 2ˣ is provided with an inlet pipe 36 having unrestricted communication with its chamber and leading to the main supply tank. 37 designates by-pass pipes leading respectively from the chambers 2 and 2ˣ to the carbureting chamber 8 and consequently being directed to a source of suction. The floats 11 are respectively connected to air vent valves 38 which when open permit air to enter the chambers 2 and 2ˣ and break down the vacuum conditions.

In describing the operation of the device, it will be assumed that the receptacle or chamber 2ˣ at the left, seen in Fig. 2, is filled to the normal level, while the opposite one is replenishing its supply. In consequence, the valve stem 17 at the right is lowered through the contact of the float 11 with the collar or pin 16 thereby opening suction valve 18 and supply valve 5 and closing valve 19 and air vent valve 25. The corresponding valves for the chamber 2ˣ at the left are in just the reverse positions. The jet or nozzle 23 is therefore being supplied from the chamber 2ˣ and under normal conditions the float 11 alternately rises and falls within the limits of the clearance provided by the collars 15 and 16. Thus as the fuel supply is used, the float lowers sufficiently to open the valve 5 just far enough to permit a flow of liquid fuel from the auxiliary reservoir 6, which again raises the level and brings the float to its former position to close the valve 5. Under normal load conditions, the float 11 may be substantially in a state of vibration so the valve 5 permits a substantially continuous quantity of fuel to pass into the chamber which approximates the amount demanded by the engine. When the reservoir 6 has emptied, the engine continues to be supplied from the chamber 2ˣ until the float lowers to carry the valve stem 17ˣ downward thereby opening suction valve 18, feed valve 5 and closing vent valve 25 and discharge valve 19ˣ. A vacuum condition is therefore produced in the chamber 2ˣ since it is closed to the atmosphere and directly communicates with the engine suction. The result of this is to draw a fresh supply of liquid fuel from the main supply tank (generally a low level tank) into the auxiliary receptacle 6 and into the chamber 2ˣ which rapidly fills to the normal level thereby raising the float. Since the valve 5 during its closing movement gradually reduces the discharge opening the receptacle 6 fills rapidly and at the time the air vent 25 is opened, a new auxiliary supply has filled the receptacle 6 in addition to bringing the liquid in the chamber 2ˣ up to its normal level. At the time the vent valve 25 opens the suction valve 18 closes and the chamber is in condition to be brought into service when required. It will be noted however, that the upward movement of the float 11 has no effect upon the valve 19ˣ since the stem 17ˣ is not connected therewith as in the construction in the other chamber 2. The foregoing description of the operation must be taken as applying to the chamber 2ˣ at the left of Fig. 2 and reference will now be made to the conditions existing in chamber 2, at the right of Fig. 1. When the chamber 2 at the right has reached the condition where its receptacle 6 is exhausted, the float 11 lowers just as described for the other chamber but when the valve 19 closes its stem being connected to the lever 26 causes the latter to tilt and open the opposite valve 19ˣ so that the chamber 2ˣ, at the left, comes into operation while the exhausted chamber at the right is being filled. The return of the float during the filling operation, which takes place under vacuum conditions, as already described, causes the valve 19 to finally open, thus removing the lever 26 from the path of the free valve 19ˣ and the latter seats automatically. In this way, one chamber supplements another and a constant fuel supply is maintained available to meet all the demands of the engine under a wide range of conditions.

The auxiliary fuel conduits 29 and 33 being connected to the low level passage 22 are always filled with liquid fuel and there are therefore substantially two auxiliary pools of fuel located adjacent the throttle valve, each of which has an outlet into the carbureting chamber 8 and an air inlet arranged to carry air into the fuel to form a priming mixture or mixture for use at relatively slow speeds. These auxiliary fuel puddles or pools are exceedingly important since one may come into operation when the main throttle valve is closed and both may operate when the throttle is cracked or partially open. Under full working conditions, however, the main suction by way of the carbureting chamber 8 causes the main jet or nozzle 23 to operate while the auxiliary outlets 30 and 34 are substantially inoperative. For starting purposes, when a relatively rich mixture is more or less essential, these auxiliary fuel pools are particularly effective.

I am aware that it has heretofore been proposed to employ supplemental liquid fuel tanks having connection with a low level liquid supply, which tanks are provided with valves, valve control mechanisms and devices for producing a vacuum in the said tanks to cause liquid to flow from the main tank of liquid fuel. These devices are, however, quite independent of the carbureter and are complicated mechanisms generally requiring a multiplicity of pipes, connections and the like. Such devices not only take up a large amount of otherwise useful space but require frequent adjustments and attention. Furthermore, the carbureter is entirely dependent upon them so that if, for any reason, any part of such tank mechanism fails to operate, the carbureter is deprived of its supply. My present invention is entirely distinct from devices of this character in that the carbureter has direct connection with the main liquid fuel supply and the conditions existing in the carbureter itself control the feeding of fuel both to the carbureter and to the engine. This construction obviates the necessity of a cumbersome supplemental tank structure with all the accessory adjuncts and consequently they are eliminated and dispensed with.

In order to insure the proper opening and closing of the respective valves 17 and 17ˣ, I preferably employ suitable springs 41 which are connected respectively at one end to the casing back of the pivot points of the levers 40, while the opposite ends of the springs join an upstanding lug 42 and normally these springs lie substantially in the dead center of the pivoted levers. In other words, under normal conditions, the spring does not have any tendency to shift the lever 40 one way or the other, but when the float rises or falls thus moving the lever 40 so that the line of the spring, that is the line between the fulcrum and the lug, passes to one side of the dead center line, the spring then exerts its pull and the valve is snapped to open or closed position and positively maintained so until the float again shifts the position of the lever 40.

It will now be apparent that I have devised a novel and useful construction which embodies the features of advantage enumerated as desirable in the statement of the invention and the above description and while I have in the present instance shown and described the preferred embodiment thereof, it is to be understood that the same is susceptible of modification in various particulars without departing from the spirit or scope of the invention or sacrificing any of its advantages.

What I claim is:

1. A liquid fuel feeding device comprising a casing forming a chamber adapted for communication with a liquid fuel supply and with a source of suction, said chamber having a valve controlled atmospheric vent, a carbureting conduit for fuel and air leading to said source of suction, a fuel discharge nozzle in said casing arranged to deliver fuel into said carbureting conduit, means regulated by the liquid level for alternately connecting said chamber with said source of suction and with the atmosphere by way of said vent and means automatically operable for controlling the feeding of liquid fuel to said nozzle.

2. A liquid fuel feeding device comprising a pair of separate chambers, each adapted to be connected to a liquid fuel supply and with a source of suction, each chamber having a valve controlled atmospheric vent, a mixing conduit for fuel and air leading to said source of suction, means having communication with each chamber for delivering liquid fuel to said conduit, means controlled by the liquid level for causing the chamber with a low liquid level to cease feeding fuel to the delivery means and the other chamber to begin such feeding and means controlled by said regulating means for sealing the depleted chamber to the air and establishing a communication between the chamber, the source of suction and the liquid supply whereby said chamber is automatically replenished.

3. A liquid fuel feeding device comprising a pair of separate chambers each adapted to be connected to a liquid fuel supply and with a source of suction, each chamber having a valve controlled atmospheric vent, a mixing conduit for fuel and air leading to said source of suction, means having communication with each chamber for delivering liquid fuel to said conduit, means controlled by the liquid level of the respective chambers for cutting off the supply of fuel to the delivery means from the chamber having the low liquid level and starting the delivery from the other chamber, means for opening the air vent of the chamber which is to feed and means for closing the air vent of the depleted chamber and establishing a communication between the latter chamber, the source of suction and the liquid supply whereby one chamber is automatically replenished while the other is being depleted.

4. In a device of the character stated, a casing forming a liquid fuel containing chamber having a plurality of outlets respectively communicating with a source of suction and a discharge nozzle and a plurality of inlets communicating respectively with the atmosphere and a liquid fuel supply means to alternately control said outlets so that one is open when the other is closed, means to alternately open and close said inlets and means under the control of the liquid level for operating said controlling means.

5. In a device of the character stated, a casing forming a liquid fuel containing chamber having communication with a main liquid fuel supply, a fuel discharge nozzle in said casing, means to supply fuel to said nozzle and means controlled by the liquid level to alternately subject said chamber to conditions of vacuum and atmospheric pressure, whereby the chamber is depleted under atmospheric pressure and is automatically replenished under vacuum conditions.

6. In a device of the character stated, a casing forming a plurality of separate liquid fuel containing chambers each having communication with a main liquid fuel supply, a fuel discharge nozzle adapted to communicate with each chamber, means under the control of the liquid level to subject one chamber or the other to either conditions of a vacuum or atmospheric pressure, and means to alternately establish communication between said chambers and said fuel discharge nozzle.

7. In a device of the character stated, a casing forming a plurality of liquid fuel containing chambers each having communication with a main liquid fuel supply, a fuel discharge nozzle adapted to connect with both chambers, valves for respectively controlling the supply of fuel from said chambers to said nozzle, a float in each chamber operable by the liquid level for controlling the respective valves and means also under control of said floats for respectively subjecting the chambers to conditions of vacuum and atmospheric pressure whereby each chamber is depleted under atmospheric pressure and is replenished under vacuum conditions.

8. In a device of the character stated, a casing forming a liquid fuel containing chamber, having a fuel inlet and a fuel outlet, said casing also being provided with a valve controlled atmospheric vent and an outlet to a source of suction, a carbureting tube for fuel and air located within said casing, a fuel discharge nozzle having communication with said fuel outlet and arranged to discharge fuel into said carbureting tube, an auxiliary receptacle for liquid fuel secured to said casing and adapted to discharge through said fuel inlet, means to establish like conditions of pressure in said receptacle and in said chamber, valves for controlling the respective inlets and outlets, a float controlled means arranged to open the auxiliary receptacle outlet and the suction valve under low level conditions and also close said air vent valve and said fuel discharge valve, whereby said chamber is automatically replenished and the auxiliary receptacle refilled to a predetermined level.

9. In a device of the character stated, a casing forming a liquid fuel containing chamber having a fuel inlet and a fuel outlet, said casing also being provided with a valve controlled atmospheric vent and an outlet to a source of suction, a carbureting tube for fuel and air located within said casing, a fuel discharge nozzle having communication with said fuel outlet and arranged to discharge fuel into said carbureting tube, an auxiliary receptacle for liquid fuel secured to said casing and adapted to discharge through said fuel inlet, means to establish like conditions of pressure in said receptacle and in said chamber, valves for controlling the respective inlets and outlets and float controlled means arranged to close the auxiliary receptacle inlet and close the suction outlet under normal level conditions and also to open said air vent valve and open said fuel discharge outlet, whereby fuel is fed to said fuel discharge nozzle.

10. In a device of the character stated, a casing forming a plurality of separate liquid fuel containing chambers, each having an inlet and a fuel discharge outlet, auxiliary receptacles mounted upon said casing and respectively connected to the fuel inlets, means to establish like pressure conditions in said receptacles and said chambers; each of said chambers also having an outlet connected to a source of suction and an atmospheric vent, valves for respectively controlling said outlets and vents; a carbureting tube for fuel and air adjacent to said chambers, a fuel nozzle arranged to discharge into said carbureting tube and having connection with both of said outlets, valves for respectively controlling the fuel inlets and outlets, means to maintain one of said outlet valves closed while the other is open, and a float controlled means for operating all of said valves in a pre-determined manner, whereby the fuel supply of one chamber is being replenished, while the supply of the other chamber is being used by said nozzle.

11. A liquid fuel feeding device comprising a casing forming a chamber adapted for communication with a liquid fuel supply and with a source of suction, said chamber having a valve controlled atmospheric vent, a carbureting conduit formed in said casing for fuel and air leading to said source of suction, a fuel discharge nozzle in said casing arranged to deliver fuel into said carbureting conduit formed in said casing liquid level for alternately connecting said chamber with the atmosphere by way of said vent and with said source of suction and means automatically operable for controlling the feeding of liquid fuel to said nozzle.

12. A liquid fuel feeding device comprising a chamber adapted for communication with a liquid fuel supply and with a source of suction, said chamber having a valve controlled atmospheric vent, a mixing conduit for fuel and air leading to said source of suction, a throttle valve for regulating said mixture, a fuel discharge nozzle arranged to deliver fuel into said mixing conduit, means regulated by the liquid level for alternately connecting said chamber with said source of suction and with the atmosphere by way of said vent and means automatically operable for controlling the feeding of liquid fuel to said nozzle.

13. In a device of the character stated, the combination of a carbureter for internal combustion engines, said carbureter having two separate liquid fuel chambers, a source of liquid fuel supply located below the level of said carbureter and communicating with both chambers and means operable to establish a condition of vacuum in said chambers alternately according to liquid level conditions, whereby said liquid fuel supply automatically replenishes the liquid fuel in both chambers.

14. In a device of the character stated, the combination of a carbureter for internal combustion engines, said carbureter having two separate liquid fuel chambers, a source of liquid fuel supply located below the level of said carbureter and communicating with both chambers and means controlled respectively by the liquid level in said chambers for establishing a condition of vacuum in the chamber having an abnormal low level whereby said liquid fuel supply automatically replenishes the liquid fuel in either chamber.

15. In a device of the character stated, the combination of a casing forming a liquid fuel containing chamber, an auxiliary receptacle for said fuel having communication with a low level liquid fuel supply and adapted to discharge into said containing chamber, means to establish like pressure conditions in the chamber and the receptacle, a fuel discharge nozzle in said casing, means controlled by the liquid level in the chamber for respectively controlling the discharge of fuel from said auxiliary receptacle and the supply of fuel to said nozzle and means also controlled by the liquid level for alternately subjecting said chamber to conditions of vacuum and atmospheric pressure.

In testimony whereof, I have hereunto signed my name in the presence of two witnesses.

ALFRED WEILAND.

Witnesses:
 ROBERT M. BARR,
 WM. J. JACKSON.